April 25, 1967 S. R. GERFAST 3,315,909

REEL LOCK

Filed June 25, 1965

INVENTOR.
STEN R. GERFAST
BY
Carpenter, Kinney & Coulter
ATTORNEYS

United States Patent Office 3,315,909
Patented Apr. 25, 1967

3,315,909

REEL LOCK

Sten R. Gerfast, St. Paul, Minn., assignor to Minnesota Mining and Manufacturing Company, St. Paul, Minn., a corporation of Delaware Filed June 25, 1965, Ser. No. 467,066
3 Claims. (Cl. 242—68.3)

This invention relates to a locking device and in one aspect to a locking device particularly adapted for retaining a reel or spool to a drive spindle.

Previously known reel locking devices have included removable caps which fit over the end of the spindle or pivoted levers which are positioned axially with respect to the spindle upon mounting the reel and which are turned to a position at right angles to the spindle to retain the reel during operation. Neither of these previously known devices are considered to be acceptable since they may be removed and lost thus requiring replacement or they lack the feature of being automatic since a reel could be placed on the spindle and if the locking device is not properly positioned or secured, the reel may fall from the spindle upon rotation thereof. This is particularly true with respect to tape recording and/or playback machines or moving picture projectors where the spindles are positioned horizontally rather than vertically.

The present invention has as one of its advantages the feature of providing an automatic lock for reels after being positioned on the spindle.

The present invention has as a further advantage the fact that the novel reel lock is incorporated as part of the spindle and is not subject to becoming lost.

The present invention provides an economical locking device which may be provided on any machine using reels or spools for winding or unwinding web material such as tape, film, ribbons, or the like.

The above and further advantages will be more fully understood as this description proceeds.

An illustrative embodiment of the present invention is described herein and the accompanying drawing wherein.

Figure 1:
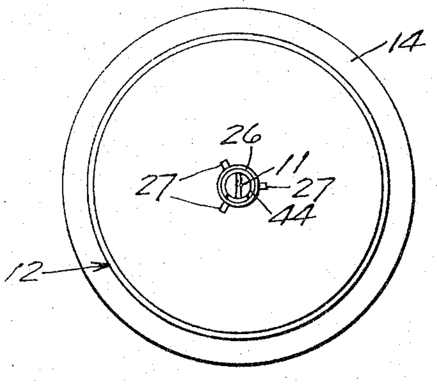
FIGURE 1 is a plan view of a reel supporting device incorporating the locking device of the present invention disposed in an unlocked position.

In tape recording and reproducing machines which utilize spools or reels to carry the tape and in film projecting machines where reels are used to carry the film, it is desirable to use a locking device to lock the reels to the spindles. This is particularly true with machines of this nature where the spindles rotate about a horizontal axis. The spindles most frequently used comprise a cylindrical spindle formed with one or more radially extending projections on the outer surface thereof which projections have the form of ribs which extend axially along the spindle to afford a drive connection with the reels. The spools or reels are generally provided with a hub having a central bore adapted to fit onto the cylindrical portion of the spindle and are provided with one or more axially extending grooves formed in the wall of said bore to cooperate with the projection or projections on the spindle.

Referring now to the drawing, there is illustrated a support plate 8 to which is mounted a shaft 9. The shaft 9 is provided at one end with means such as the threads 10 to fixedly mount the shaft 9 on the support plate. The opposite end of the shaft 9 is provided with a diametrical slot 11 to aid in fastening the shaft 9 to the plate 8. Intermediate the ends of the shaft 9 is rotatably mounted a reel supporting member, generally designated 12, in the form of a disc or drum. The member 12 is formed to be journalled on the shaft 9, as illustrated more clearly in FIGURE 4, and is thus provided with a central bore 13 which receives the shaft 9. Around the outer peripheral surface of the member 12 is a ring 14 adapted for driving engagement with a driven wheel (not shown) placed in contact therewith. The member 12 is also provided with a spindle 16 which is an integral part of the reel supporting member 12 and which extends along the shaft 9 in the direction away from the fixed end of said shaft. As illustrated, the spindle 16 has three radially projecting and axially extending projections or ribs 17 adapted to be received in corresponding grooves formed in the hub of a reel when the same is mounted on said spindle to provide a driving connection between the spindle 16 and the hub of the reel. Spaced from the threaded end portion of the shaft 9 is a circumferential groove formed in the shaft and adapted to receive a crescent ring or spring clip 19 which together with a washer 21 affords means to limit the axial movement of the supporting member 12 toward the fixed end of the shaft 9.

Rotatably mounted on the shaft 9 and adjacent the free end thereof, is a sleeve 26 formed with a central bore and formed on its outer surface with three radially and axially extending projections or ribs 27. The central bore of the sleeve 26 is defined by two bores of varying diameter, one of which is only slightly larger than the outside diameter of the shaft 9 to define a bearing surface at 28 with the surface of the shaft 9 and a second diameter greater than that of the shaft which defines a shoulder 29 within the sleeve 26.

Figure 2:
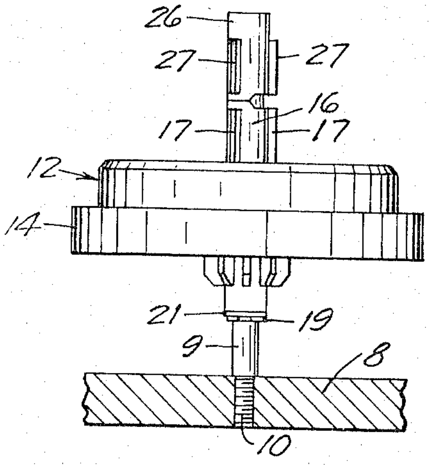
FIGURE 2 is an elevational view of the device as shown in FIGURE 1.

The sleeve 26 is mounted adjacent the spindle 16 with one end of the sleeve 26 is opposed relation to the outer or free end of the spindle 16. The opposing ends of the spindle 16 and sleeve 26 are provided with cooperating camming surfaces which are formed such that there is a mating relationship between said opposed ends, and said camming surfaces are formed such that when said camming surfaces are in mating engagement the camming surface on the end of the spindle 16 tends to urge the sleeve 26 axially toward the free end of the shaft 9 upon rotation of the spindle 16 in either direction of rotation. In the illustrated embodiment the camming surfaces are defined by axially spaced planar surfaces joined by surfaces in oblique planes with respect to said planar surfaces. As illustrated in the drawing, the oblique surfaces are disposed in a single plane in diametrically opposed relation. Thus, the free end of the spindle 16 is provided with a first surface 33 and an outer axially spaced surface 34 joined by oblique surfaces 35. The opposed end of the sleeve 26 is similarly formed with a first planar surface 37 and a recessed or axially spaced surface 38 joined by inclined surfaces 39. The camming surfaces on the opposed ends of the spindle 16 and the sleeve 26 are so formed with respect to the projections 17 and 27 to place said projections 27 in circumferentially spaced out-of-line relation with the projections 17 when the camming surfaces are in full contact with each other (see FIGURES 3 and 4) and permit alignment of the projections 17 with the projections 27 when the sleeve 26 is moved axially with respect to the spindle 16 and when the cam surfaces are out of complete contact with each other (see FIGURES 1, 2 and 5).

Figure 3:
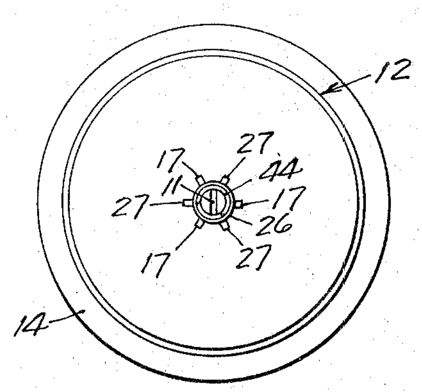
FIGURE 3 is a plan view of a reel supporting spindle incorporating the locking device of the present invention with the same illustrated in a reel locking position.
Figure 4:
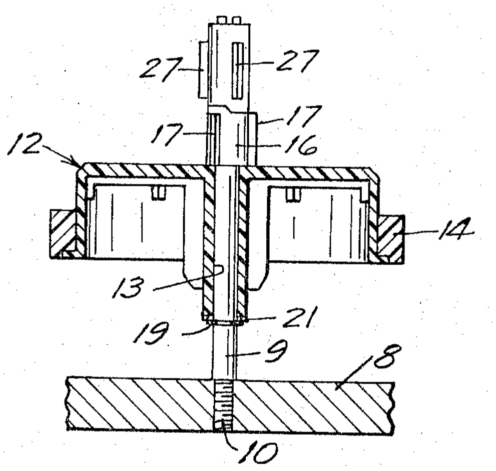
FIGURE 4 is an elevational view of the device shown in FIGURE 3, with parts thereof shown in section.
Figure 5:
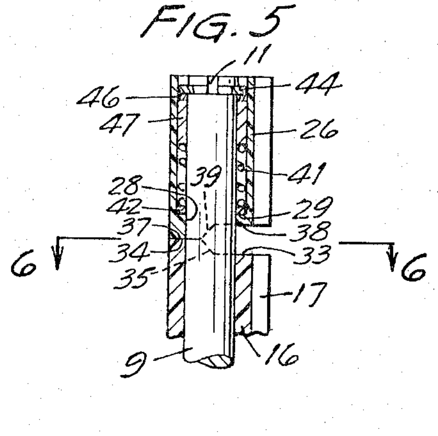
FIGURE 5 is a fragmentary vertical sectional view of the free end of the spindle and the locking device.
Figure 6:
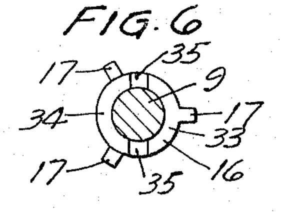
FIGURE 6 is a transverse sectional view taken along line 6—6 of FIGURE 5.
Figure 7:
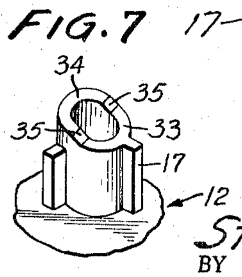
FIGURE 7 is a perspective view of the reel supporting spindle shown in FIGURE 6.

The sleeve 26 is urged toward the spindle 16 and is provided with brake means to impede the rotation of the sleeve 26 with respect to the spindle 16 when the cooperating camming surfaces are out of full contact with each other. The sleeve 26 is urged toward the spindle 16 by means of a helical compression spring 41 disposed within the bore of the sleeve 26. The spring has one end thereof bearing against the shoulder 29 or a washer 42 disposed between the end of the spring 41 and the shoulder 29. The opposite end of the spring 41 bears against means defining a shoulder on the shaft 9. In the illustrated embodiment, a groove is formed circumferentially around the shaft 9 adjacent the free end thereof and receives a spring clip or crescent ring 44 which retains a washer 46 and a sleeve 47 on the end of the shaft 9. The washer 46 and/or the sleeve 47 provide a bearing support for the outer end, or upper end as viewed in the drawings, of the sleeve 26. The sleeve 47 fitting within the bore of the sleeve 26 defines the shoulder means against which the other end of the spring 41 is positioned. The compression spring 41 is sufficiently stout to produce a frictional force between the shaft 9 and the sleeve 26 which is greater than the frictional force between the contacting surfaces 34 and 37 of the opposed ends of the spindle 16 and sleeve 26 respectively. Therefore, when the members 16 and 26 are in the position shown in FIGURES 1, 2 and 5, the brake means including the spring and the shoulders impedes rotation of the sleeve 26, thus allowing the spindle 16 to rotate relative to the sleeve 26 until the camming surfaces are positioned such that the spring 41 will urge the sleeve 26 axially to place the camming surfaces in full contact with each other. When the camming surfaces are in full contact with each other as illustrated in FIGURES 3 and 4, the spring has sufficient force to prevent axial movement of the sleeve 26 with respect to the spindle 16 and the sleeve 26 is rotatably driven with the spindle 16 upon rotation of said spindle.

In operation, the spindle 16 of the reel supporting member 12 is generally held against rotation by a brake within the machine and a reel may be placed on the upper cylindrical part of sleeve 26 and when turned the grooves in the hub of the reel will mate with the projections 27. The reel may then be rotated slightly to rotate the sleeve 26 causing axial movement thereof, due to the cooperating camming surfaces on the sleeve 26 and spindle 16, to a position where the projections 27 are in axial alignment with the projections 17 on the spindle 16. The reel will then move onto the spindle 16 with the grooves in the hub of the reel receiving the projections 17. When operation of the machine begins and the spindle 16 is rotated, or when the reel is rotated by hand, in either direction, the spindle 16 will turn relative to the sleeve 26 until such time as the camming surfaces come into mating engagement. As the surfaces come into mating position the sleeve 26 will be moved axially and will thereafter rotate with the spindle 16. With the camming surfaces of the sleeve 26 and spindle 16 in full contact with each other the projections 27 on the sleeve 26 will be out of alignment with the projections 17 on the spindle 16, thus preventing the reel from moving axially on the spindle 16.

The spindle 16 preferably has an overall length which is slightly less than the axial width of the reel and reel hub. The projections 27 on the sleeve 26 extend to a position adjacent the end thereof formed with the cam surface to actually engage and urge the reel against the planar surface of the reel supporting member 12 under the force of the spring 41. When the spindle 16 is so formed the adjacent camming surfaces of the spindle 16 and sleeve 26 may be contacting only at the inclined or oblique surfaces and will be otherwise slightly spaced. The spring 41 does however maintain the cam surfaces in a position so the sleeve 26 will rotate with the spindle 16 and in such position the cam surfaces are considered herein to be in full contact.

To remove the reel from the spindle the operator merely grasps the sleeve 26 and rotates it to a position where the projections 27 are aligned axially with the projections 17.

Having thus described the invention with reference to a preferred embodiment thereof, it is to be understood that various changes may be made without departing from the spirit or scope of the invention which is defined in the following claims.

What is claimed is:

1. An automatic reel locking device for use with a transporting apparatus adapted to receive a reel which is formed with a hub having a central bore adapted to fit on a spindle and provided with at least one axially extending groove formed in the wall of said bore, said device comprising in combination a shaft, said shaft having one end adapted to be fixedly mounted to a support plate, reel supporting means including a spindle rotatably mounted on said shaft, means to limit axial movement of said supporting means toward the said one end of said shaft, said spindle extending along said shaft in a direction away from said one end of said shaft and terminating with an outer end portion, said spindle having at least one radial projection on its outer surface adapted to fit in a said groove of a said reel for driving engagement therewith, a sleeve journalled on said shaft adjacent said outer end portion of said spindle and being urged toward said spindle, said sleeve having at least one projection on the outer surface of said sleeve, the outer end portion of said spindle and the opposed end of said sleeve being formed with cooperating camming means for positioning said projections on said sleeve and on said spindle in circumferential spaced relation when said camming means are in full contact, and brake means for said sleeve affording relative rotation between said sleeve and said spindle when said camming means are out of full contact such that upon rotation of said spindle relative to said sleeve, said sleeve will move axially toward said spindle placing said camming means in full contact to so position the projection on said sleeve in said spaced relation to the projection on said spindle to lock a reel on said spindle.

2. An automatic reel locking device for use with a transporting apparatus adapted to receive a reel which is formed with a hub having a central bore and provided with at least one axially extending groove in the wall of said bore, said device comprising in combination an elongate shaft, said shaft having a pair of ends one of which is adapted to fixedly mount said shaft on a support plate, reel supporting and driving means including a spindle rotatably mounted on said shaft, means to limit axial movement of said supporting means toward the said one end of said shaft, said spindle extending along said shaft in a direction away from said one end of said shaft and terminating with an outer end portion, said spindle having at least one radial projection on its outer surface for cooperating driving engagement with a said groove in a said reel, a sleeve journalled on said shaft adjacent the outer end portion of said spindle and being urged toward said spindle, said sleeve having at least one projection on the outer surface of said sleeve, the outer end portion of said spindle and the opposed end of said sleeve being formed with cooperating camming surfaces having mating full contacting engagement and which are formed to urge said sleeve axially away from said spindle when in full contact upon rotation of said spindle, said projections on said sleeve and on said spindle being positioned with respect to the cooperating camming surfaces to place said projections in circumferential spaced relation when said camming surfaces are in full contact, and brake means for said sleeve to impede rotation of said sleeve relative to said shaft when said camming surfaces are out of full contact, such that upon rotation of said spindle said camming surfaces will be moved into full contact and said sleeve will be urged axially toward said spindle to lock a reel on said spindle.

3. An automatic reel locking device for use with a web transporting apparatus adapted to receive a reel which is formed with a hub having a central bore and provided with at least one axially extending groove formed in the wall of said bore, said device comprising in combination an elongate shaft having opposite end portions with one end portion adapted to be secured to a support plate in fixed relation thereto and having shoulder means formed adjacent the other end portion, reel supporting means rotatably mounted on said shaft intermediate its ends and having a spindle extending along and concentrically with said shaft and terminating with an outer end portion, said outer end portion having two axially spaced surfaces joined by oblique surfaces, said spindle being formed with at least one radially projecting and axially extending rib on the outer surface thereof adapted to be received in a groove of a said reel hub to drive the said reel, a cylindrical sleeve mounted on said shaft adjacent the other end portion of said shaft and formed at the end positioned adjacent said outer end portion of said spindle with two axially spaced planar surfaces joined by oblique surfaces and adapted to mate with the end surfaces of said outer end portion of the spindle, said sleeve having at least one radially projecting rib on the outer surface thereof and placed thereon with respect to said oblique surfaces and the rib on said spindle such that when said sleeve and said spindle have the adjacent end surfaces in mating engagement the rib on said sleeve is circumferentially spaced from the rib on said spindle, and spring means positioned within said sleeve and bearing against said shoulder means on the shaft and against said sleeve to bias said sleeve toward and into engagement with said spindle and affording a frictional brake between said sleeve and said shaft to permit relative rotation between said spindle and said sleeve when said adjacent end surfaces are out of mating engagement.

References Cited by the Examiner

UNITED STATES PATENTS

| | | | |
|---|---|---|---|
| 2,803,413 | 8/1957 | Lyon | 242—68.3 |
| 3,064,916 | 11/1962 | Feurer | 242—68.3 |
| 3,099,413 | 7/1963 | Kress et al. | 242—68.3 |

FRANK J. COHEN, *Primary Examiner.*

N. L. MINTZ, *Assistant Examiner.*